(12) United States Patent
Bergman et al.

(10) Patent No.: US 7,708,106 B1
(45) Date of Patent: May 4, 2010

(54) REAR SWING ARM SUSPENSION FOR AN ATV

(75) Inventors: James Bergman, Oslo, MN (US); Larry G. Holter, Alvarado, MN (US)

(73) Assignee: Polaris Industries Inc., Medina, MN (US)

( * ) Notice: Subject to any disclaimer, the term of this patent is extended or adjusted under 35 U.S.C. 154(b) by 955 days.

(21) Appl. No.: 11/227,459

(22) Filed: Sep. 15, 2005

(51) Int. Cl.
*B60K 17/00* (2006.01)

(52) U.S. Cl. ..................................... 180/349

(58) Field of Classification Search ............... 180/349; 280/124.128, 124.135
See application file for complete search history.

(56) References Cited

U.S. PATENT DOCUMENTS

| | | | | |
|---|---|---|---|---|
| 2,633,203 | A | 3/1953 | Paton | 180/12 |
| 4,392,536 | A | 7/1983 | Iwai | 180/217 |
| 4,463,964 | A | 8/1984 | Takayanagi | 280/284 |
| 4,535,869 | A | 8/1985 | Tsutsumikoshi | 180/311 |
| 5,107,952 | A | 4/1992 | Matsubayashi | 180/349 |
| 5,458,359 | A | 10/1995 | Brandt | 280/124.111 |
| 5,467,839 | A | 11/1995 | Yoshio | 180/233 |
| 5,575,352 | A | 11/1996 | Suzuki | 180/311 |
| 5,746,275 | A | 5/1998 | Cross | 172/440 |
| 5,845,918 | A | 12/1998 | Grinde | 280/124.1 |
| 6,446,748 | B1 | 9/2002 | Suzuki | 180/350 |
| 6,675,926 | B2 | 1/2004 | Montague | 180/350 |
| 6,799,781 | B2 * | 10/2004 | Rasidescu et al. | 280/781 |
| 6,851,691 | B2 * | 2/2005 | Rasidescu et al. | 280/124.135 |
| 2001/0027890 | A1 | 10/2001 | Bria | 180/291 |
| 2003/0217884 | A1 | 11/2003 | Kawamoto | 180/292 |
| 2005/0247507 | A1 * | 11/2005 | Fecteau et al. | 180/357 |

* cited by examiner

*Primary Examiner*—Faye M. Fleming
(74) *Attorney, Agent, or Firm*—Baker & Daniels LLP (57) ABSTRACT

A vehicle having a rear suspension according to the present teachings may include one or more of the following features: (a) a chassis carrying a seat, (b) at least one front wheel and at least one rear wheel coupled to the chassis, (c) a steering member for steering the at least one front wheel, (d) an engine carried by the chassis for powering the vehicle, (e) a swing arm having a first end and a second end, the first end coupled to a rear axle coupled to the rear wheel, (f) the second swing arm end coupled to the chassis at a point forward of a vertical centerline bisecting the vehicle, and (g) a suspension system operably coupled to the axle and the chassis.

32 Claims, 12 Drawing Sheets

REAR SWING ARM SUSPENSION FOR AN ATV

FIELD

This invention relates to a rear suspension system for motor vehicles and more particularly to a rear suspension system for all terrain vehicles (ATV).

BACKGROUND

ATV's are gaining in popularity and are used extensively by farmers, gardeners, ranchers, sportsmen, etc. Most ATV's have a tongue-like hitch secured to the rear end of the vehicle so that the vehicle may pull a trailer or the like. Many ATV's have also been equipped with a three-point hitch at the rearward end thereof to enable the vehicle to support a disk, plow, or the like, with the three-point hitch having the capability to raise or lower the implement with respect to the ground. Although the prior art three-point hitches for ATV's have been extensively used, the prior art three-point hitches suffer from certain drawbacks.

When a load is put on the rear of a current ATV or when any attachment or implement is coupled to the rear of the ATV, that load gets transferred through the frame, through the suspension, and through the axle. For example, if the operator were to lift a cultivator, a snow blower, or any other item off the ground with a 3 point hitch kit you mounted on the chassis of the ATV, that load gets transferred through the frame, through the suspension, and through the axle. This causes the ATV suspension to collapse. This collapse of the suspension creates an uncomfortable riding position for the operator causing them to be leaning backwards.

Typically, to compensate for the suspension collapse the operator can lock up the suspension. However, this creates a rough riding environment, as the suspension is unable to absorb the shock force created by the terrain during operation. Therefore, there is a need for a rear suspension system that eliminates the drawbacks of the prior rear suspensions and provides a comfortable ride when a load or implement is coupled to the rear of an ATV.

SUMMARY

A vehicle having a rear suspension according to the present teachings may include one or more of the following features: (a) a chassis carrying a seat, (b) at least one front wheel and at least one rear wheel coupled to the chassis, (c) a steering member for steering the at least one front wheel, (d) an engine carried by the chassis for powering the vehicle, (e) a swing arm having a first end and a second end, the first end coupled to a rear axle coupled to the rear wheel, (f) the second swing arm end coupled to the chassis at a point forward of a vertical centerline bisecting the vehicle, and (g) a suspension system operably coupled to the axle and the chassis.

A vehicle having a rear suspension according to the present teachings may include one or more of the following features: (a) a chassis carrying a saddle type seat, (b) at least one front wheel and at least one rear wheel coupled to the chassis, (c) a steering member for steering the at least one front wheel, (d) an engine carried by the chassis for powering the vehicle, (e) a swing arm having a first end and a second end, the first end coupled to the chassis rearward of a vertical centerline bisecting the vehicle, (f) the second swing arm end coupled to the chassis at a point forward of the vertical centerline bisecting the vehicle, and (g) a suspension system operably coupled to the axle and the chassis.

A vehicle having a rear suspension according to the present teachings may include one or more of the following features: (a) a chassis carrying a seat, (b) at least one front wheel and at least one rear wheel coupled to the chassis, (c) a steering member for steering the at least one front wheel, (d) an engine carried by the chassis for powering the vehicle, (e) a swing arm having a first end and a second end, the first end coupled to a rear axle coupled to the rear wheel, (f) the second swing arm end extends forward beyond a vertical centerline bisecting the vehicle, and (g) an accessory hitch operably coupled to the chassis.

DESCRIPTION OF VARIOUS EMBODIMENTS

The following discussion is presented to enable a person skilled in the art to make and use embodiments of the invention. Various modifications to the illustrated embodiments will be readily apparent to those skilled in the art, and the generic principles herein may be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention. The following introductory material is intended to familiarize the reader with the general nature and some of the features of embodiments of the invention.

Figure 1A:
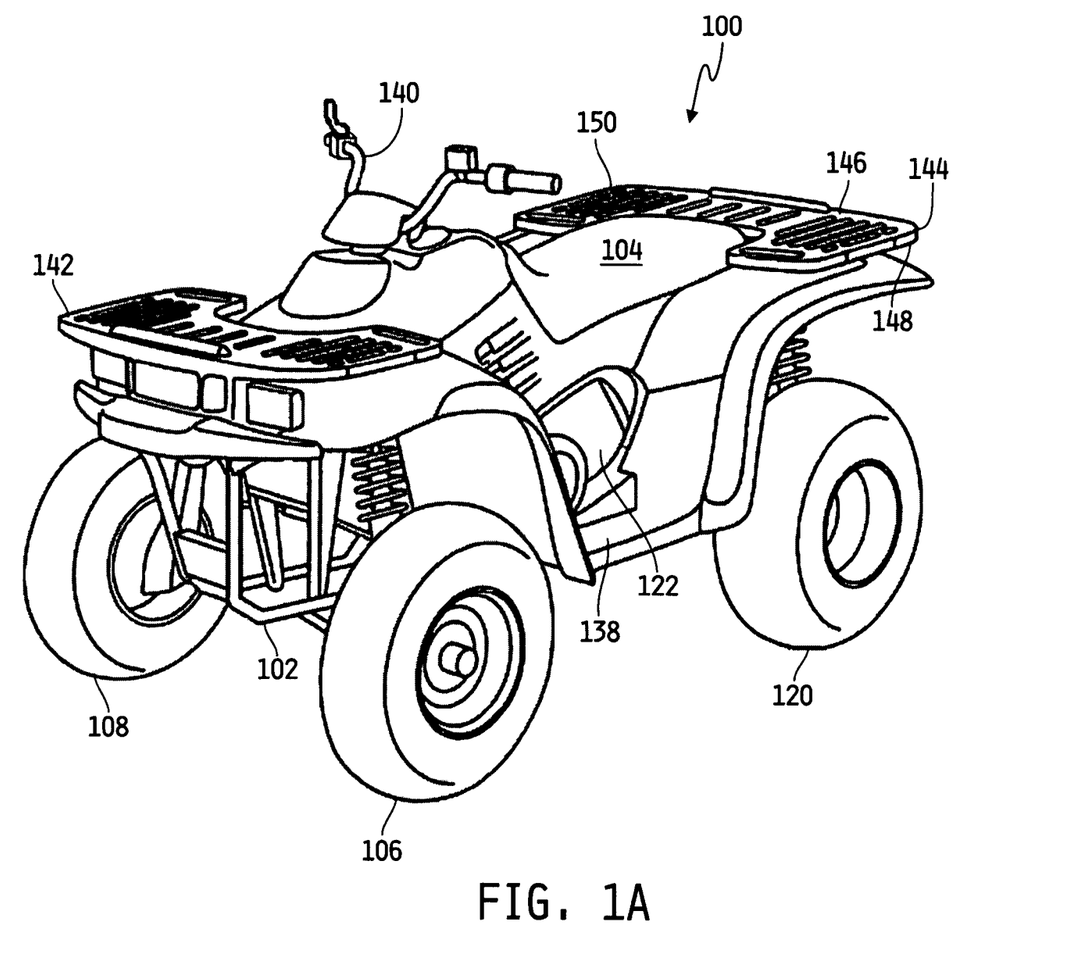
FIG. 1A shows a perspective view of an ATV in an embodiment of the present teachings.

FIG. 1A is a perspective view of a vehicle 100 in accordance with an exemplary embodiment of the present teachings. Vehicle 100 of FIG. 1A can be generally referred to as an ATV. Vehicle 100 can have a chassis 102 carrying a straddle type seat 104. In FIG. 1A, straddle type seat 104 is sufficiently narrow to be straddled by a vehicle rider. Vehicle 100 can have a left front wheel 106, a right front wheel 108, a left rear wheel 120, and right rear wheel. In some embodiments, vehicle 100 could have tracks 123 as shown in FIG. 1C. Vehicle 100 can also include an engine 122 that is carried by chassis 102. Engine 122 can be coupled to at least some wheels of vehicle 100 via a drive train for propelling vehicle 100. Engine 122 can be used to power each rear wheel 120 and 121, and in some cases also each front wheel 106 and 108. It is fully contemplated other devices such as a motor could be used to power vehicle 100 without departing from the spirit of the present teachings.

Vehicle 100 can also include a first footrest 138 that can be seen extending from one side of the chassis 102 in FIG. 1A. Vehicle 100 can also include a second footrest (not shown in FIG. 1A) that extends from the other side of chassis 102. Vehicle 100 also includes member 140 that may be used for steering vehicle 100. In FIG. 1A, steering member 140 comprises a handlebar. Vehicle 100 can also include at least one mounting aperture 150. For example, mounting aperture 150 can be located on accessory platforms 142 and 144 often referred to as racks. Accessory platforms 142 and 144 can have a top surface 146 and a bottom surface 148 coupled to chassis 102. Accessory platform 144 can have at least one mounting aperture 150 extending from top surface 146. It is fully contemplated mounting aperture 150 could be located anywhere on vehicle 100 such as chassis 102, the body of vehicle 100, and footrest 138 without departing from the spirit of the present teachings.

Figure 1B:
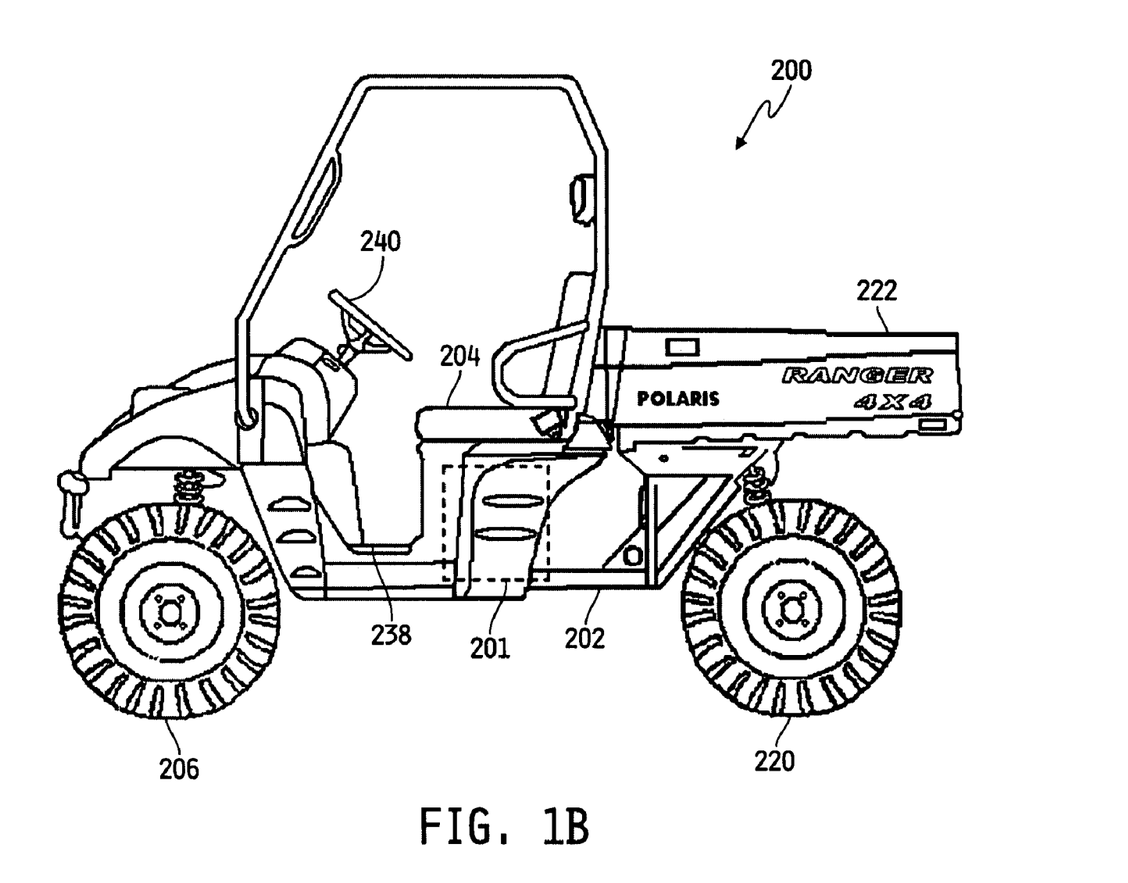
FIG. 1B shows a perspective view of a utility vehicle in an embodiment of the present teachings.
Figure 1C:
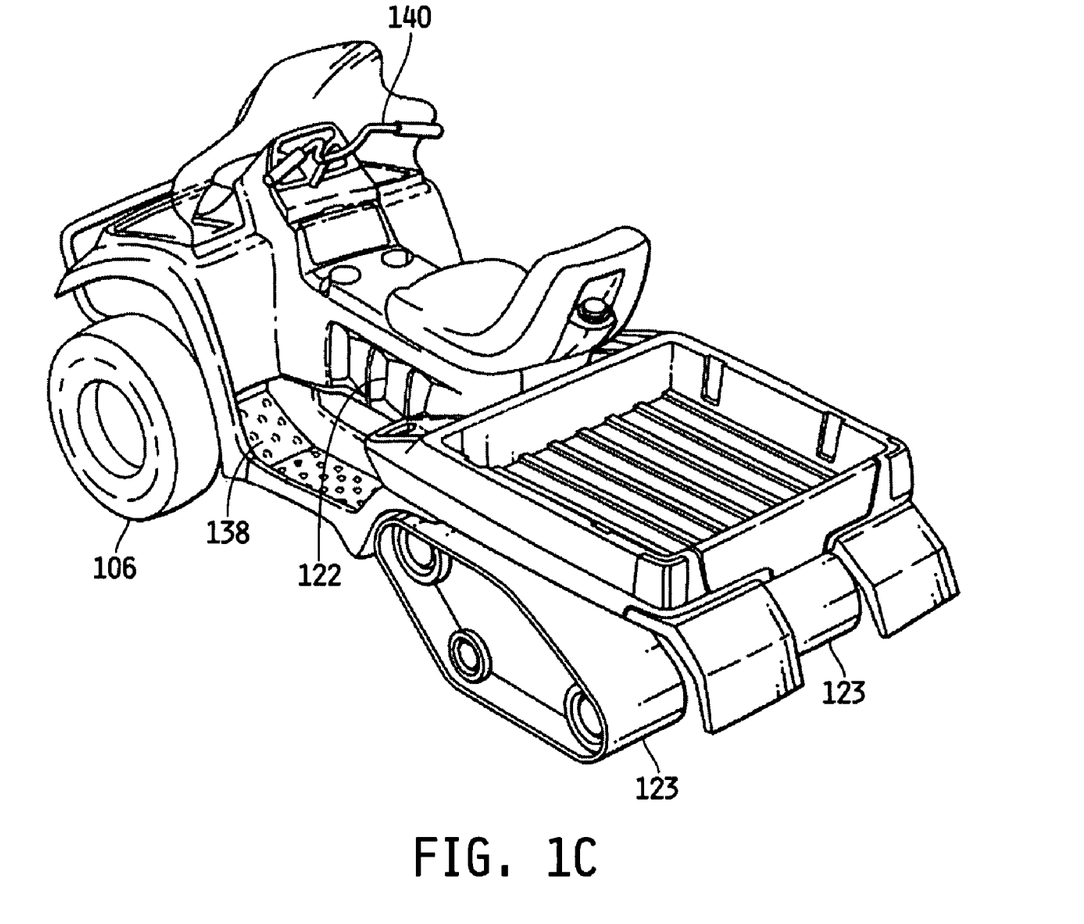
FIG. 1C shows a side profile view of an ATV in an embodiment of the present teachings.

FIG. 1B is another perspective view of a vehicle in accordance with an embodiment of the present teachings. Vehicle 200 of FIG. 1B can be generally referred to as a utility vehicle. Vehicle 200 can have a chassis 202 carrying a bench type seat 204. In FIG. 1B, bench type seat 204 can be sufficiently wide to hold more than one vehicle rider. It is contemplated the embodiments for FIGS. 1A and 1B could have two seats, a seat large enough for two or more people to straddle, or side-by-side seating such as bucket style seats without departing from the spirit of the present teachings. Vehicle 200 can have a left front wheel 206, a right front wheel, a left rear wheel 220 and right rear wheel. In some embodiments, vehicle 200 could have tracks 123 similar to those shown in FIG. 1C. Vehicle 200 also includes an engine 201 that is carried by chassis 202. Engine 201 is preferably coupled to at least some wheels of vehicle 200 via a drive train for propelling vehicle 200. Engine 201 may be used to power any wheel on vehicle 200. It is fully contemplated that engine 201 could be a motor or any other apparatus to propel vehicle 200 without departing from the spirit of the present teachings.

Vehicle 200 can also include a footrest 238 that can be seen extending from one side of the chassis 202 to the other side. Vehicle 200 can also include member 240 that may be used for steering vehicle 200. In the embodiment of FIG. 1B, steering member 240 comprises a steering wheel. Vehicle 200 can also have an accessory platform mounted to the front of the vehicle.

Figure 2:
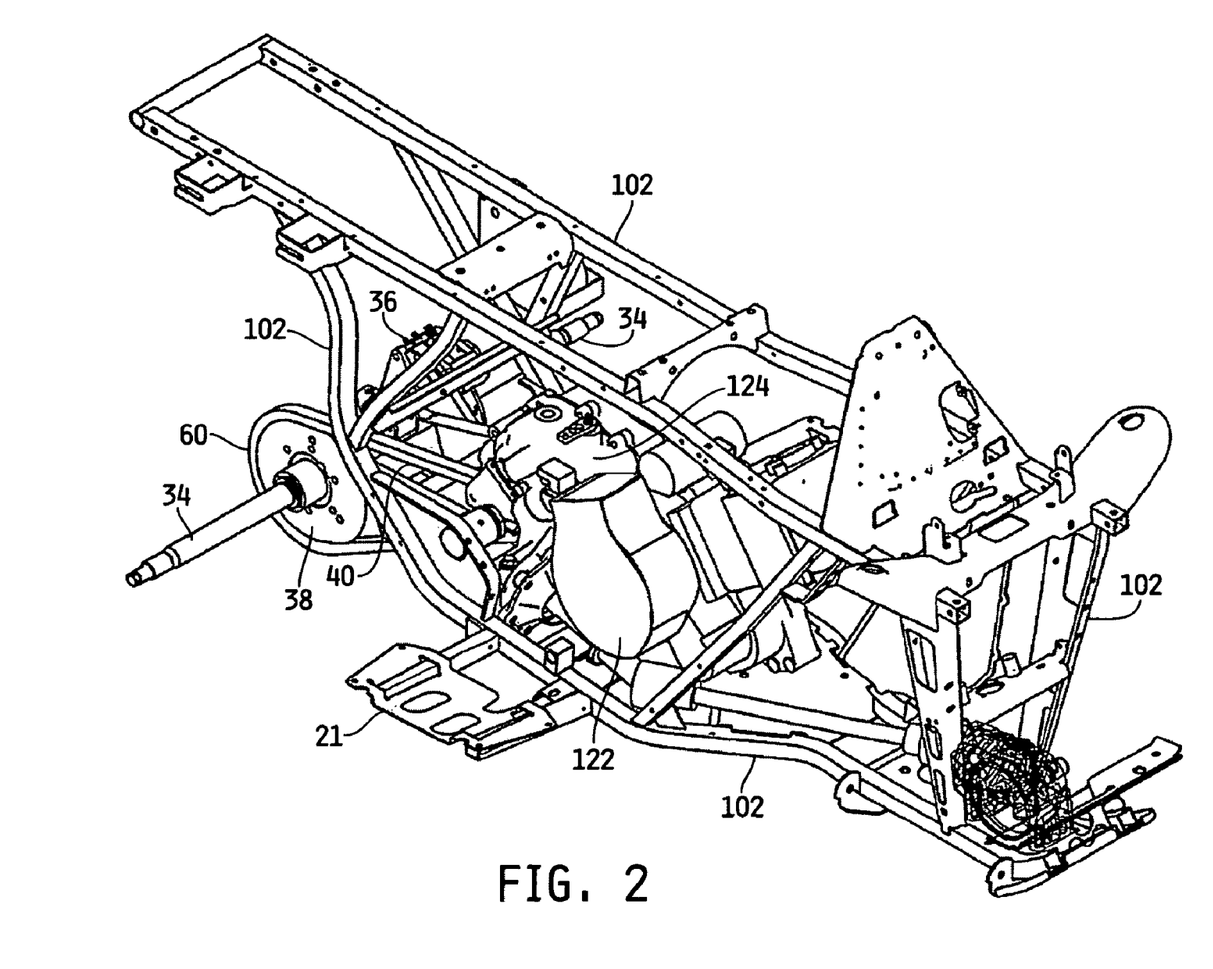
FIG. 2 shows an elevated side profile view of an ATV employing a rear swing arm.

With reference to FIG. 2, an elevated side profile view of an ATV employing a rear swing arm is shown. Chassis 102 is generally elongated in shape, being sufficiently narrow to permit the use of the straddle-type seat 104 shown in FIG. 1A. Chassis 102 includes frame support members 21 for supporting the foot rests 138. Engine 122 and transmission 124 are mounted to chassis 102 generally beneath the upper portion of chassis 102 (to which the straddle-type seat 104 is secured) and substantially between the footrest support members. Other components of ATV 100 (including the wheels, body panels, etc.) have been omitted from most of the drawings to better show the suspension.

ATV's of the invention have rear wheels 120 connected to a common rear drive axle 34. Rear axle 34 in turn is connected to chassis 102 by a swing arm 40. The front end of swing arm 40 is typically pivotally mounted to chassis 102, and the rear end of swing arm 40 carries rear axle 34. A disk brake caliper assembly 36 can be provided on rear axle 34.

Figure 3:
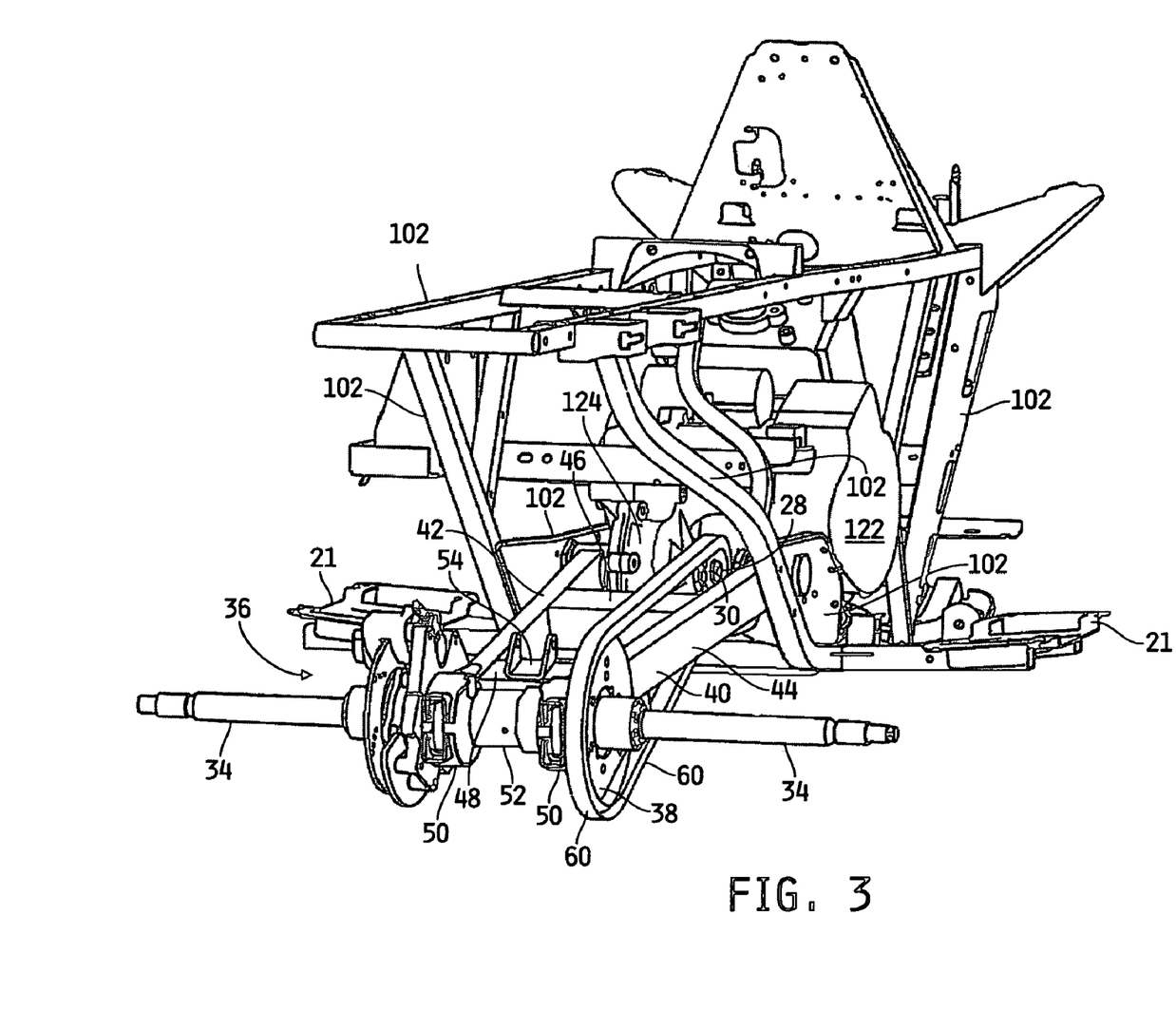
FIG. 3 shows a rear profile view of an ATV employing a rear swing arm.

With reference to FIG. 3, a rear profile view of an ATV employing a rear swing arm is shown. Transmission 124 includes an output shaft 28 carrying a chain sprocket 30. Rear axle 34 similarly carries a chain sprocket 38, and an endless chain 60 is disposed about the two sprockets 30 and 38 to convey motive power from the output shaft 28 of the transmission to the rear axle 34 (for ease of illustration neither the teeth of the axle sprocket 38 nor the individual links of the chain 60 are detailed in the drawings, the chain 60 and the axle sprocket 38 being shown somewhat schematically). It will be understood that an endless belt may also be used instead of a link chain, in which case belt pulleys would replace the chain sprockets.

Figure 4:
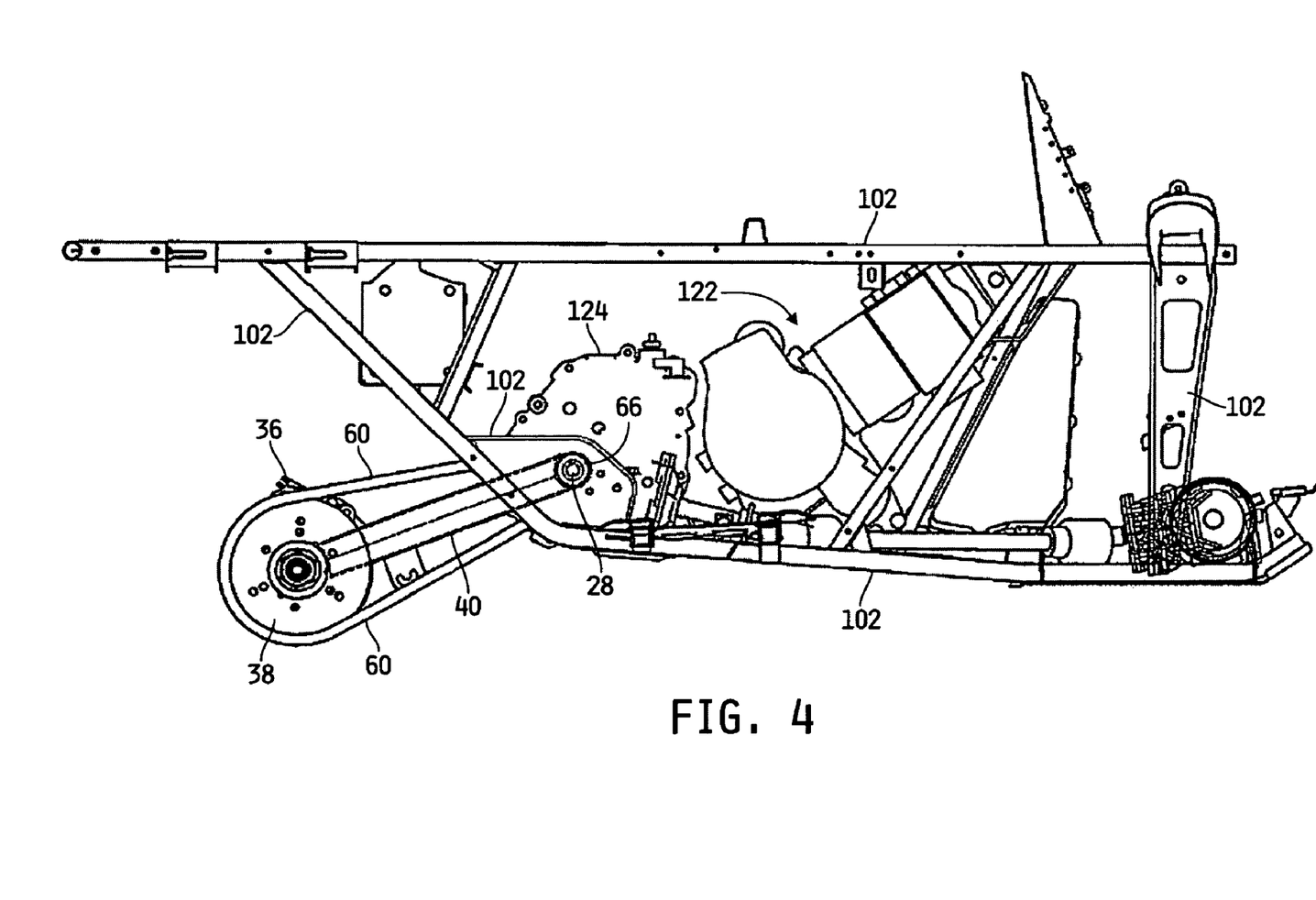
FIG. 4 shows a side profile view of an ATV employing a rear swing arm.

With respect to FIGS. 2-4, an ATV employing a rear swing arm is shown. The general frame of swing arm 40 may be constructed in any suitable fashion. As shown the swing arm frame includes left and right tubular members 42 and 44 welded to a pair of tubular cross-members 46 and 48. The rear cross-member 48 carries a bracket 54 for mounting the lower end of a shock absorber (not shown), the upper end of such shock being mounted to chassis 102. A coil spring is mounted around the shock. Although ATV 100 depicted in the drawings is designed to have a single shock and a single spring, a pair of shocks and a pair of springs may also be used if desired. The shock and spring resiliently suspend the rear end of swing arm 40 (and, thus, the axle and wheels) with respect to chassis 102. Thus, as ATV 100 encounters bumps or uneven terrain the rear end of swing arm 40 moves up and down with respect to the chassis 102 to smooth the ride for the driver and to reduce the shock loads on the ATV components.

The rear end of swing arm 40 (i.e., in this embodiment, the rear ends of the left and right tubular members 42 and 44) carries rear axle 34. Any suitable connection between the swing arm 40 and the rear axle may be provided. As shown in the drawings the left and right tubular members 42 and 44 carry collar-type clamps 50 which are secured about an eccentric bearing carrier 52 within which the rear axle 34 rotates.

Figure 5:
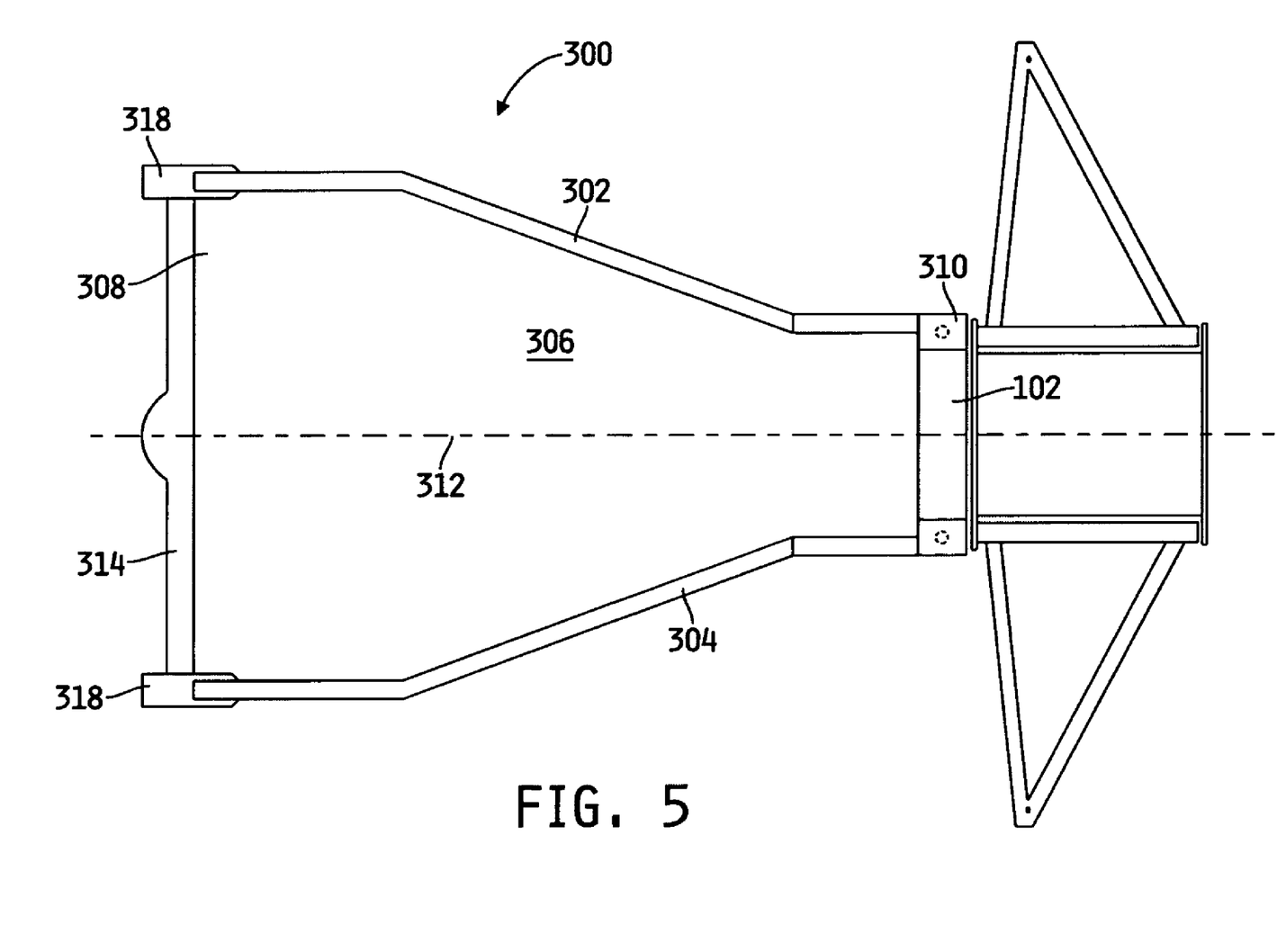
FIG. 5 shows a top profile view of a rear swing arm in an embodiment of the present invention.

With reference to FIG. 5, a top profile view of a rear swing arm in an embodiment of the present invention is shown. Rear swing arm 300 has a first frame member 302, a second frame member 304, and pan 306, which extends from frame member 302 to frame member 304. Frame members 304 and 302 can be welded to pan 306, however, any method of attachment, such as bolting or riveting can be used without departing from the spirit of the invention. As shown, swing arm 300 is wide, but not so wide that swing arm 300 might begin rubbing on tires 120. The inventors have found that this wide swing arm 300 allows for vehicle 100 to better distribute the load area, thus better distributing the weight placed on vehicle 100 by an implement attached to vehicle 100. Pan 306, which extends from frame member 302 and 304 also provides a wide area underneath vehicle 100 to protect the undercarriage of vehicle 100 and also allows for PTO (power takeoff) drive lines to run underneath of vehicle 100 which protects the lines from being drug on the ground or getting caught on weeds or sticks. The inventor's have found that a swing arm 300 having a rear portion 308 approximately 25 inches wide, 12½ inches from centerline 312, then bending in towards 4.75 inches from centerline 312 at front portion 310 provides good load distribution. However, other dimensions for swing arm 300 are fully contemplated including an equal distance separating frame members 302 and 304 from rear portion 308 to front portion 310 without departing from the spirit of the invention.

Figure 6:
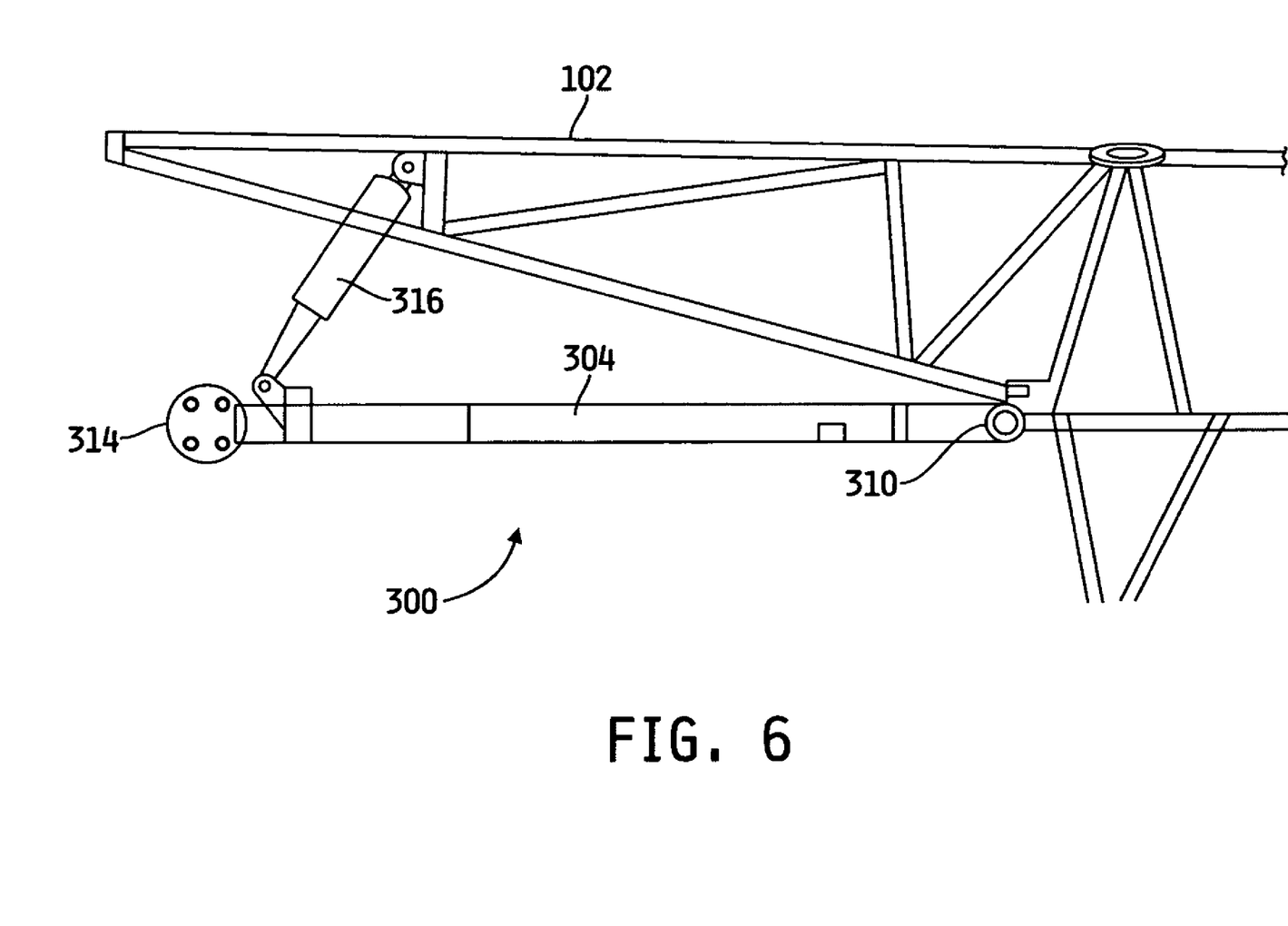
FIG. 6 shows a side profile view of a rear swing arm in an embodiment of the present invention.
Figure 7:
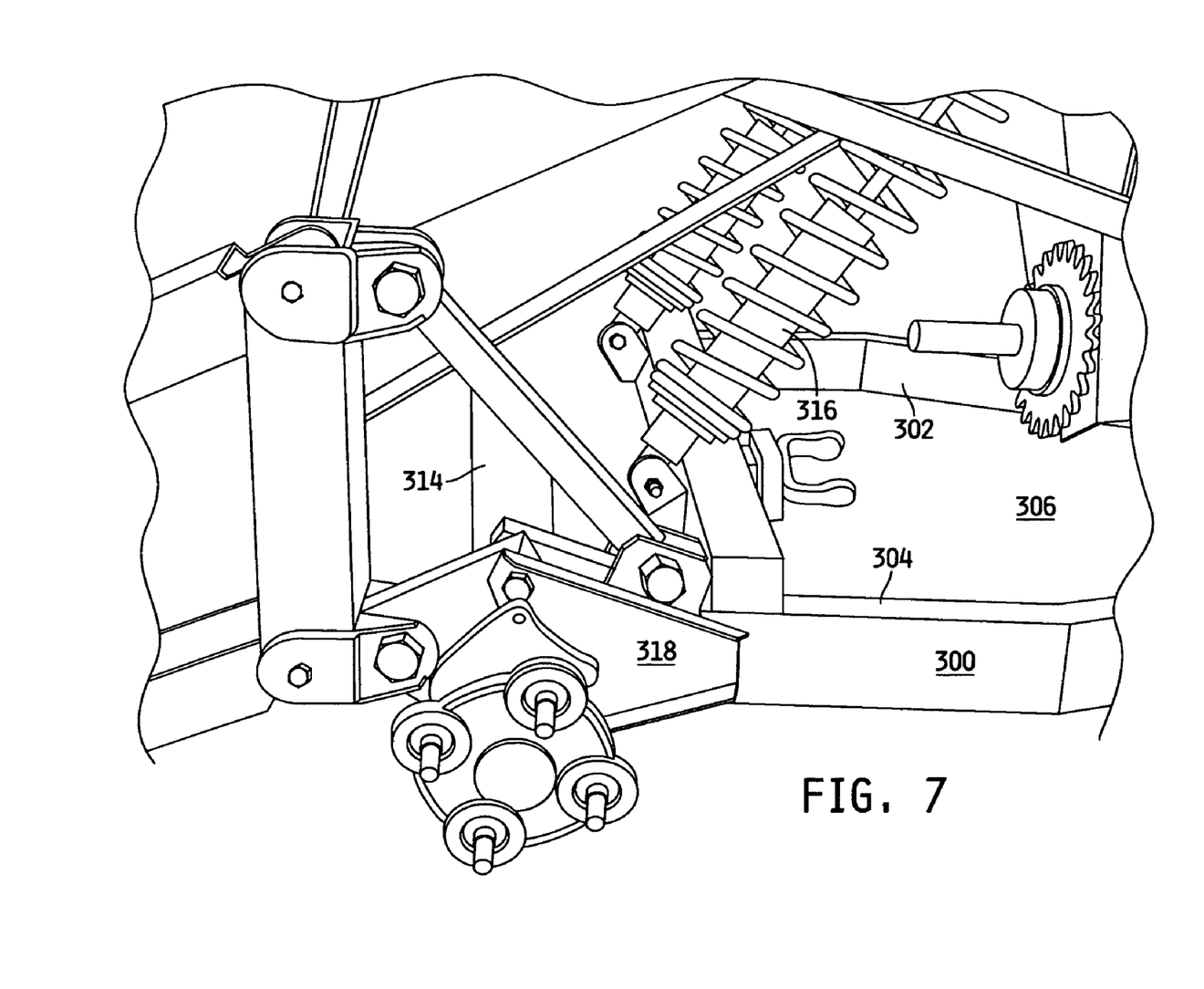
FIG. 7 shows a rear side profile view of a rear swing arm in an embodiment of the present invention.

With reference to FIG. 6, a side profile view of a rear swing arm in an embodiment of the present invention is shown. Rear swing arm 300 can be coupled to rear axle 314 with flange mechanism 318 (FIG. 7). Flange mechanism 318 is basically a flange bolt which allows for rear swing arm 300 to be unbolt from rear axle 314; however, any type of connection to the rear axle is contemplated without departing from the spirit of the invention including welding the swing arm to a solid axle carrier. However, flange mechanism 318 allows swing arm 300 to more easily become one piece with rear axle 314. Moving forward from rear axle 314, frame members 302 and 304 are manufactured from aluminum tube generally 1×3 inches. As stated above frame members 302 and 304 bend together as they reach front portion 310. Rear suspension 316 supporting chassis 102 can be U-bolted to rear swing arm 300.

Figure 8:
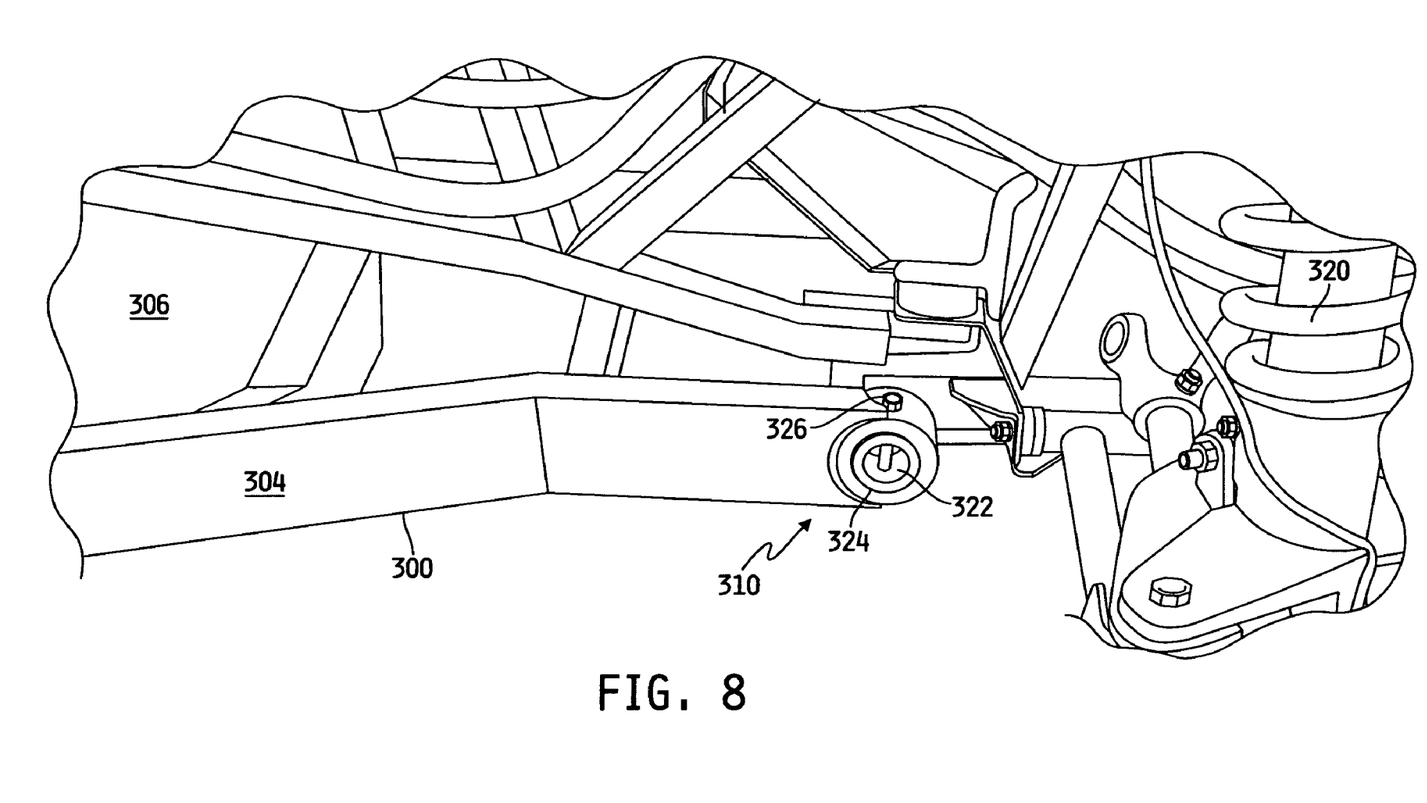
FIG. 8 shows a front side profile view of a rear swing arm in an embodiment of the present invention.

Moving further forward to front portion 310 and with reference to FIG. 8, connection to chassis 102 close to front suspension 320 is shown. Swing arm 300 is connected to chassis 102 by a shaft 322 that traverses through swing arm 300 and chassis 102. Swing arm 300 has a center bore 324 which is aligned with a bore through chassis 102 near front suspension 320. Swing arm 300 bore 324 is aligned with the chassis bore so that shaft 322 can be inserted through bore 324 and the chassis bore. Cotter pins 326 are then used to secure swing arm 300 to shaft 322 thus securing swing arm 300 to chassis 102. Shaft 322 rotates freely within the chassis bore, thus allowing horizontal movement for swing arm 300, which is described in more detail below.

Figure 9:
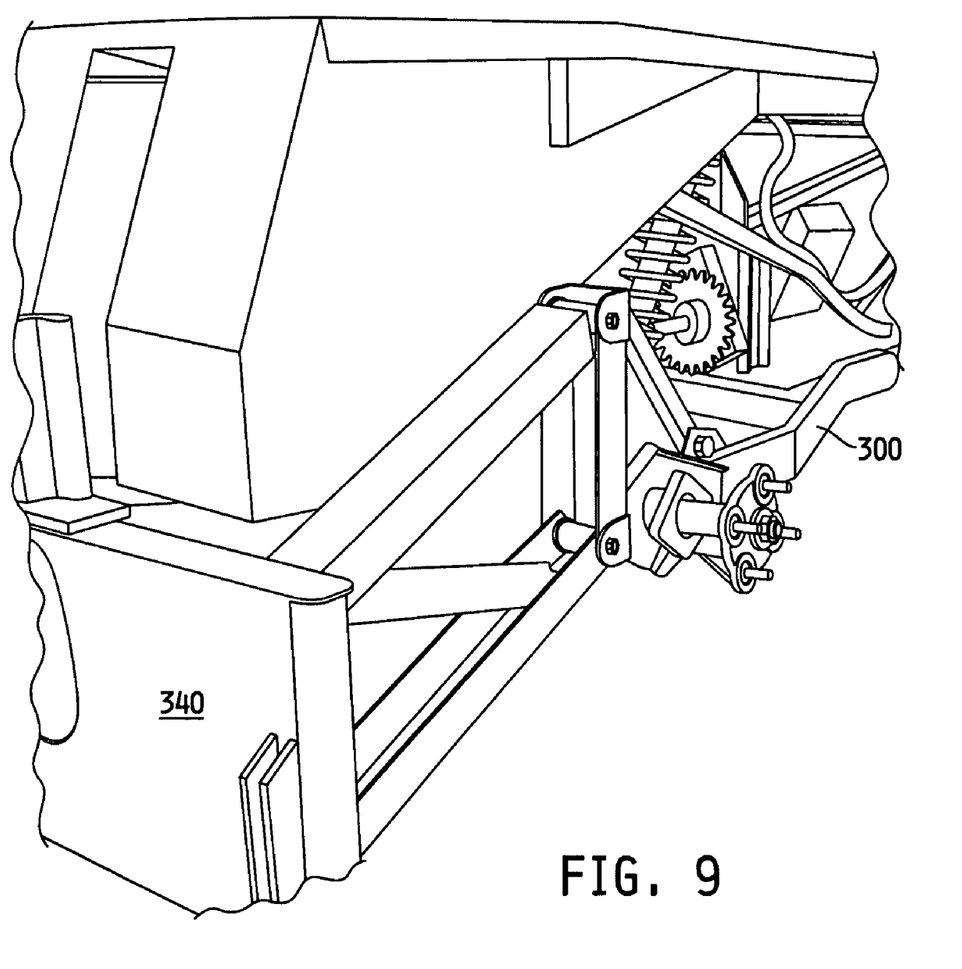
FIG. 9 shows a rear profile view of an ATV having an apparatus hitch and a rear swing arm in an embodiment of the present invention.

With reference to FIG. 9, a rear profile of an ATV having an apparatus hitch and a rear swing arm in an embodiment of the present invention is shown. ATV's have the ability to have hitches mounted to them, such as three point hitch 340, which allow the operators to raise and lower such implements as cultivators, snow blades, buckets, and tillers. However, as discussed above, when a load is put on the back of a current ATV the load is transferred to the chassis. Therefore, for example, if the operator has 3 point hitch 340 mounted on the chassis of the vehicle, what happens is when an implement is lifted off the ground that load gets transferred through the chassis, through the suspension, through the axle. This causes the suspension to collapse. Furthermore, as the vehicle moves in any direction the implement would cause the suspension to "see-saw" or bounce thus reducing the amount of control over the implement.

Figure 10:
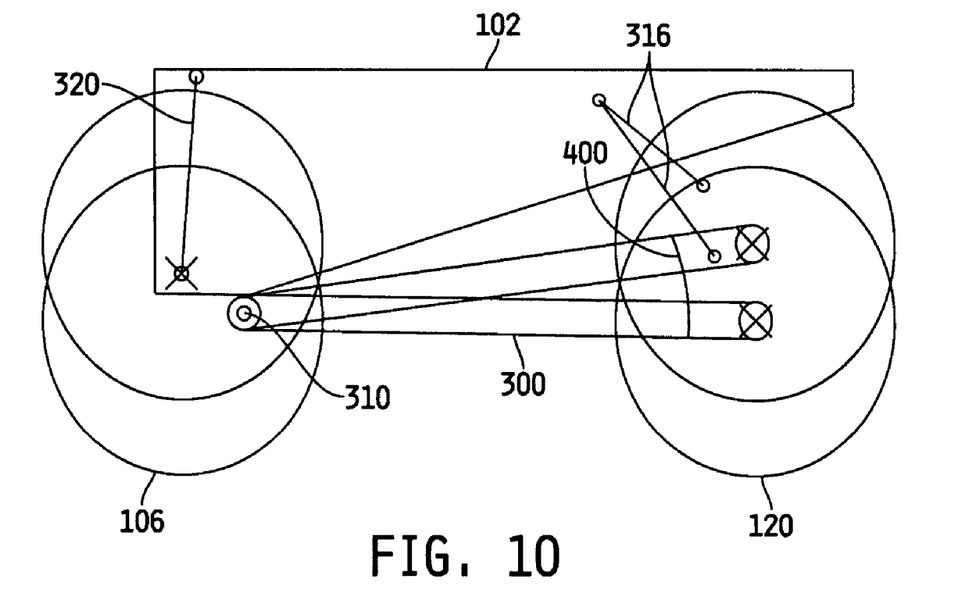
FIG. 10 shows a side diagrammatic profile of an ATV having a rear swing arm in an embodiment of the present invention.
Figure 11:
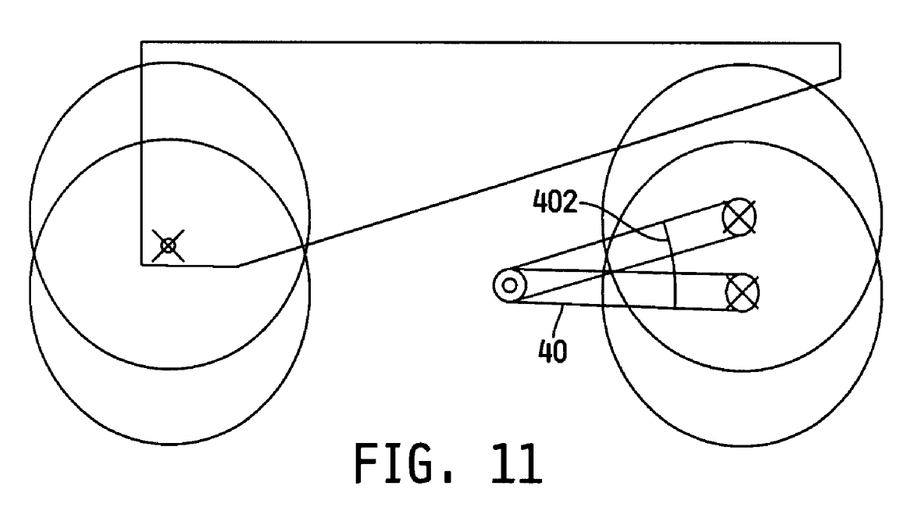
FIG. 11 shows a side diagrammatic profile of an ATV having a rear swing arm of the prior art.

With reference to FIG. 10, a side diagrammatic profile of an ATV having a rear swing arm in an embodiment of the present invention is shown. The implements are mounted to swing arm 300 via hitch 340 and the load is transferred through swing arm 300 to chassis 102. By extending the swing arm mounting point near front suspension 320 the amount of load an implement transfers to the vehicle's chassis 102 is minimized at the swing arm front connection point due to having a longer moment arm from the axle pivot point. The only effect on rear suspension 316 is the load transferred by the moment produced between swing arm 300 and the front mounting point at front portion 310. As can be see with reference to FIGS. 10 and 11, the angle of travel 400 for swing arm 300 is less than the angle of travel 402 of prior swing arms 40. This decrease in angle helps in reducing the "see-saw" or bouncing effect created by the implement as the vehicle travels along. This is especially useful for particular implements, such as a sprayer, when there is a desire to keep the distance between the implement and the ground constant. Further, as discussed above the width of swing arm 300 assists in creating more surface area in which to disperse the load. This contributes to a better long-term durability of both the axle, swing-arm, and suspension components. Thus by decreasing the angle of travel of swing arm 300 and increasing the surface area of swing arm 300 the vehicle is able to better disperse the load created by a large implement while stabilizing the rear portion of the vehicle.

Thus, embodiments of the REAR SWING ARM SUSPENSION FOR AN ATV are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A vehicle having a rear suspension, comprising:
   a chassis carrying a seat;
   at least one front wheel and at least one rear wheel coupled to the chassis;
   a steering member for steering the at least one front wheel;
   an engine carried by the chassis for powering the vehicle;
   a rear swing arm having a first end and a second end, the first end coupled to a rear axle coupled to the rear wheel; and
   the second end of the rear swing arm coupled to the chassis at a point forward of a vertical centerline bisecting the vehicle.

2. The vehicle of claim 1, wherein the swing arm has a length greater than 20 inches from the first end to the second end.

3. The vehicle of claim 2, wherein the swing arm has a length less than 75 inches from the first end to the second end.

4. The vehicle of claim 1, further comprising a suspension system operably coupled to the axle and the chassis.

5. The vehicle of claim 1, wherein the second end is operably coupled to a front axle.

6. The vehicle of claim 1, wherein the second end is operably coupled to a front wheel suspension system.

7. The vehicle of claim 1, wherein the swing arm is proximal to a terrain and provides protection to an undersurface of the vehicle.

8. A vehicle having a rear suspension, comprising: a chassis carrying a saddle type seat;
   at least one front wheel and at least one rear wheel coupled to the chassis; a steering member for steering the at least one front wheel;
   an engine carried by the chassis for powering the vehicle;
   a rear swing arm having a first end and a second end, the first end coupled to the chassis rearward of a vertical centerline bisecting the vehicle; and
   the second end of the rear swing arm coupled to the chassis at a point forward of the vertical centerline bisecting the vehicle.

9. The vehicle of claim 8, wherein the swing arm provides for a protective pan for an undercarriage of the vehicle.

10. The vehicle of claim 8, wherein the swing arm has a horizontal arc of rotation less than 20 degrees.

11. The vehicle of claim 10, wherein the swing arm has a horizontal are of rotation less than 15 degrees.

12. The vehicle of claim 8, wherein the swing arm has a length greater than 20 inches from the first end to the second end.

13. The vehicle of claim 12, wherein the swing arm has a length less than 50 inches from the first end to the second end.

14. The vehicle of claim 8, further comprising a suspension system operably coupled to the axle and the chassis.

15. A vehicle having a rear suspension, comprising:
a chassis carrying a seat;
at least one front wheel and at least one rear wheel coupled to the chassis; a steering member for steering the at least one front wheel;
an engine carried by the chassis for powering the vehicle;
a rear swing arm having a first end and a second end, the first end coupled to a rear axle coupled to the rear wheel; and
the second end of the rear swing arm extends forward beyond a vertical centerline bisecting the vehicle.

16. The vehicle of claim 15, further comprising an accessory hitch operably coupled to the chassis.

17. The vehicle of claim 16, wherein an accessory is operably coupled to the accessory hitch.

18. The vehicle of claim 17, wherein the swing arm substantially reduces vertical movement of a rear suspension system while towing the accessory.

19. The vehicle of claim 18, wherein a horizontal arc created by the swing arm while towing an accessory is less than 20 degrees.

20. The vehicle of claim 19, wherein the swing arm has a length greater than 15 inches from the first end to the second end.

21. The vehicle of claim 1, further comprising a front axle coupled to the front wheel, wherein the rear swing arm as a length that is greater than half a distance between the front axle and the rear axle.

22. The vehicle of claim 1, wherein the first end of the rear swing arm is positioned rearward of the vertical centerline bisecting the vehicle.

23. The vehicle of claim 1, wherein the rear swing arm is positioned between the chassis and the rear axle.

24. The vehicle of claim 1, further comprising a front axle coupled to the front wheel, wherein the second end of the rear swing arm is positioned closer to the front axle than to the rear axle.

25. The vehicle of claim 1, further comprising a compressible suspension positioned between the rear swing arm and the chassis to provide resistance to movement between the rear wheel and the chassis.

26. The vehicle of claim 8, wherein the first end of the rear swing arm and the rear axle move together relative to the chassis in response to movement of the rear wheel relative to the chassis.

27. The vehicle of claim 8, wherein the rear axle has an uppermost position relative to the chassis and a lowermost position relative to the chassis and travels a distance between the uppermost and lowermost positions, and a ratio of the distance to a length of the rear swing arm is less than about 0.25.

28. The vehicle of claim 8, wherein the rear swing arms includes a pair of spaced-apart frame members and a pan extending between the pair of spaced-apart frame members.

29. The vehicle of claim 15, wherein the first end of the rear swing arm is positioned rearward of the engine and the second end of the rear swing arm is positioned forward of the engine.

30. The vehicle of claim 15, wherein the first end of the rear swing arm is positioned rearward of the second end of the rear swing arm.

31. The vehicle of claim 30, wherein the second end of the rear swing arm is positioned closer to the front wheel than to the rear wheel.

32. The vehicle of claim 15, wherein a portion of the rear swing arm is positioned forward of the vertical centerline and a portion of the rear swing arm is positioned rearward of the vertical centerline.

\* \* \* \* \*